(12) United States Patent
Van Winkle

(10) Patent No.: US 8,950,709 B2
(45) Date of Patent: Feb. 10, 2015

(54) HANDLE FOR DUAL MODE AIRBORNE VEHICLE LANDING

(71) Applicant: The Boeing Company, Chicago, IL (US)

(72) Inventor: Roy C. Van Winkle, Yorba Linda, CA (US)

(73) Assignee: The Boeing Company, Chicago, IL (US)

( * ) Notice: Subject to any disclaimer, the term of this patent is extended or adjusted under 35 U.S.C. 154(b) by 140 days.

(21) Appl. No.: 13/848,215

(22) Filed: Mar. 21, 2013

(65) Prior Publication Data

US 2014/0284427 A1 Sep. 25, 2014

(51) Int. Cl.
| | | |
|---|---|---|
| *B64D 17/80* | (2006.01) | |
| *B64D 25/00* | (2006.01) | |
| *B64G 1/62* | (2006.01) | |

(52) U.S. Cl.
CPC . *B64D 17/80* (2013.01); *B64G 1/62* (2013.01)
USPC .......................................................... 244/139

(58) Field of Classification Search
CPC ...................................................... B64D 17/80
USPC .............. 244/138 R, 139, 140, 141, 144, 902
See application file for complete search history.

(56) References Cited

U.S. PATENT DOCUMENTS

| | | | | | |
|---|---|---|---|---|---|
| 1,233,087 | A | * | 7/1917 | MacLean ...................... | 244/139 |
| 4,108,402 | A | * | 8/1978 | Bowen ......................... | 244/139 |
| 5,078,335 | A | * | 1/1992 | David ............................... | 244/2 |

OTHER PUBLICATIONS

Fallon II, Edward J., Taylor, Anthony P.; Landing System Design Summary of the K-1 Reusable Launch Vehicle; American Institute of Aeronautics and Astronautics, AIAA-99/1720, 1999.
Taylor, A. P.; The Case for Explicit Finite Element Analysis of Fabric Systems, a Presentation of Real World Applications; American Institute of Aeronautics and Astronautics, AIAA 2001-2002, 2001.

* cited by examiner

*Primary Examiner* — Brian M O'Hara
(74) *Attorney, Agent, or Firm* — Felix L. Fischer

(57) ABSTRACT

An apparatus for reorientation of an airborne vehicle during decent employs a handle rotatably attached to the airborne vehicle and connected to a parachute. Once the parachute is deployed, rotation of the handle reorients a deck angle of the airborne vehicle with respect to the parachute.

17 Claims, 10 Drawing Sheets

HANDLE FOR DUAL MODE AIRBORNE VEHICLE LANDING

BACKGROUND INFORMATION

1. Field

Embodiments of the disclosure relate generally to the field of aerodynamic deceleration systems for airborne vehicles, and more particularly to a system and method for a selectable alignment angle for aerial descent and landing of an airborne vehicle.

2. Background

Reentering spacecraft which are not aerodynamically configured and controlled are typically recovered using aerodynamic deceleration and landing parachutes. Mercury, Gemini and Apollo spacecraft all employed this form of recovery system that includes an attachment of parachute risers to a fixed point on the spacecraft. However, in certain cases it may be desirable to have differing angular presentation of the spacecraft during descent and/or prior to landing to accommodate such issues as water versus hard surface landing conditions.

It is therefore desirable to provide an attachment system for parachute risers which allows angular adjustment of the spacecraft orientation.

SUMMARY

Embodiments disclosed herein provide an apparatus for reorientation of an airborne vehicle during decent employing a handle rotatably attached to the airborne vehicle and connected to a parachute. Once the parachute is deployed, rotation of the handle reorients a deck angle of the airborne vehicle with respect to the parachute.

In one embodiment, a command module (CM) includes a parachute attachment system that employs a handle rotatably attached to the CM. The handle has an unrotated position and a rotated position and a suspended deck angle of the CM is altered between the unrotated and rotated position. An attachment plate on the handle attaches to risers of a parachute and at least one release assembly is operable to release the handle from the unrotated position to the rotated position.

The embodiments provide a method of reorientation of an airborne vehicle during descent through attachment of a parachute to a rotatable handle connected to the airborne vehicle. The parachute is then deployed and, if an alternative deck angle is desired, the handle is rotated to reorient the airborne vehicle deck angle.

The features, functions, and advantages that have been discussed can be achieved independently in various embodiments of the present disclosure or may be combined in yet other embodiments further details of which can be seen with reference to the following description and drawings.

DETAILED DESCRIPTION

Embodiments disclosed herein provide a mechanism that allows for the reorientation of an airborne vehicle or load such as a reentering spacecraft, shuttle, command module (CM), or cargo using a parachute or similar type deceleration method to allow for landing on land or water. A handle having a structure for parachute attachment is attached to the CM with hinges and may be stowed and locked down under a thermal protection cover using a support structure that carries the parachute opening loads. The handle is fastened to the CM in the stowed unrotated condition using separation nuts. After parachute deployment the handle is rotatable about the hinges to reorient the capsule under one or more parachutes to provide a nearly flat deck angle. Dual mode operation is enabled since the handle may be left in the stowed configuration (high hang angle) for water landings (similar to Apollo), or rotated about the hinges to create the flat or nearly flat hang angle for land landing operations. The handle further simplifies the parachute riser line routing and management of those cables during deployment.

The release of the handle for rotation may be achieved by actuating separation nuts that secure the handle to the CM. When the handle is released, the handle is allowed to rotate freely about the hinges and rotation of the handle may be limited by a damper to prevent over rotating.

Figure 1:
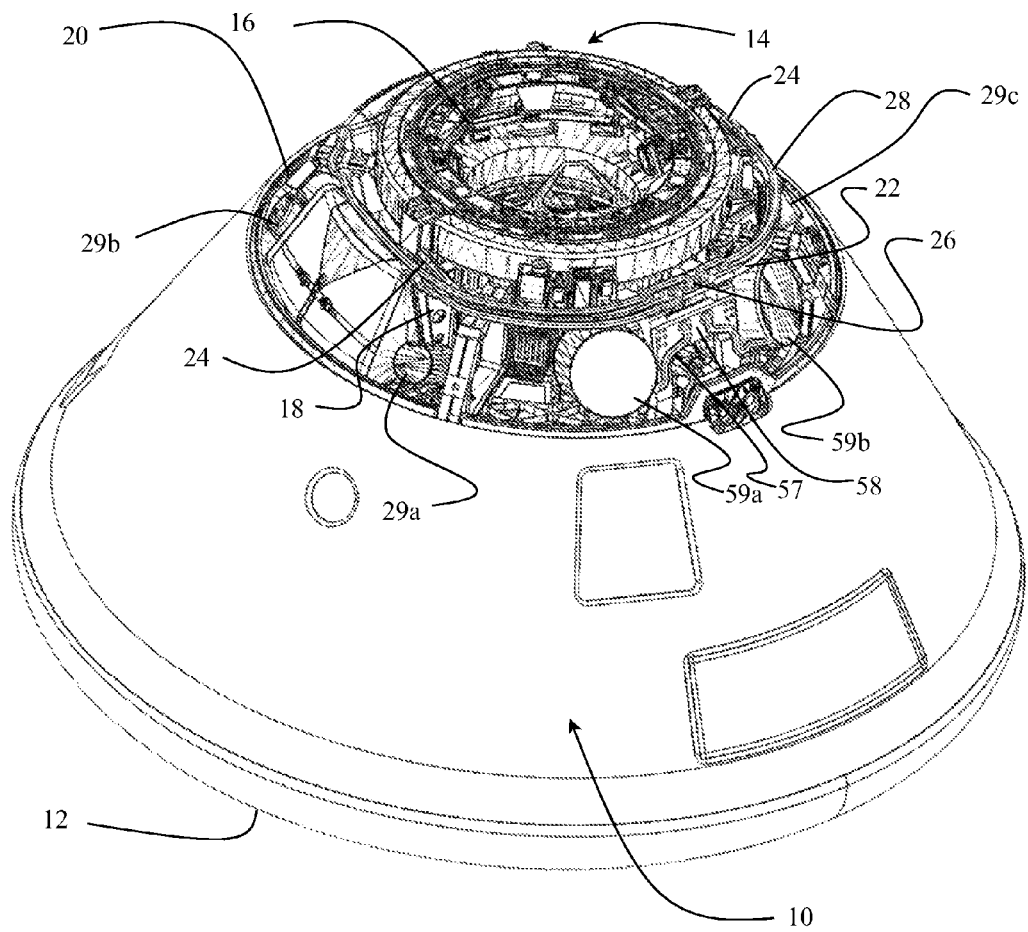
FIG. 1 is a isometric view of an example spacecraft on which the disclosed embodiments may be employed.

FIG. 1 shows one example of an airborne vehicle, such as CM 10, and an attachment/deceleration system which allows for angular adjustment of the CM during aerial decent. The CM 10 includes a blunt base 12 with a heat shield (not shown) for re-entry. A nose 14 of the CM 10, shown with the thermal cover removed for clarity, houses various systems including an exit or docking mechanism 16. A support structure 18, to be described in greater detail subsequently, is integrated into the CM 10 at a forward bulkhead 20. In one embodiment, a handle 22 may be attached to the support structure 18 with hinges 24. An attachment plate 26 may be located at or near the center of the handle 22 for attachment of risers or cables 28 that attach to one or more parachutes or a similar type device used to decelerate the CM during retry and recovery. The undeployed parachute system may be stored in various containers 29a-29c arranged in the nose of the CM 10.

Figure 2:
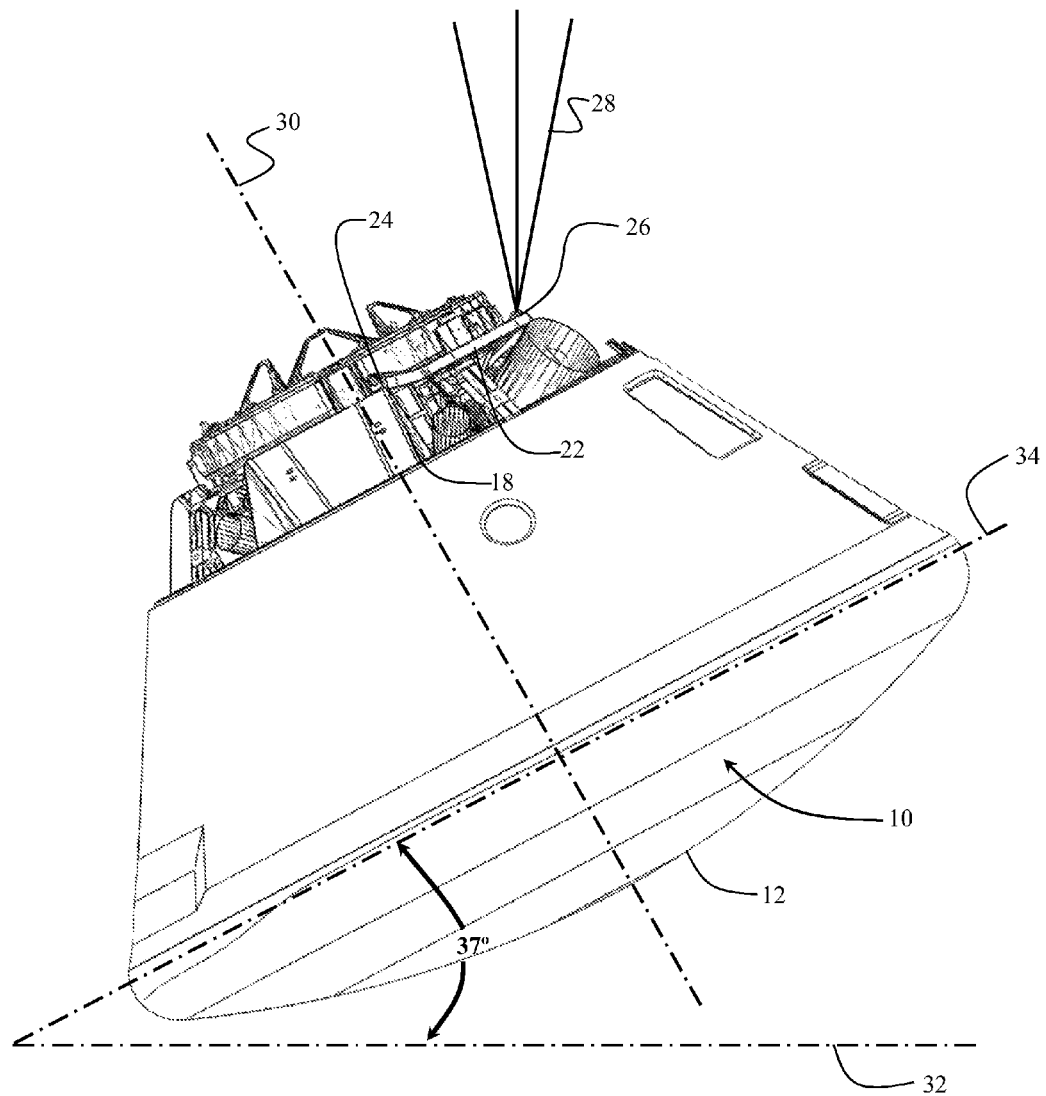
FIG. 2 is a side view of the spacecraft suspended from risers with a handle in the initial unrotated position.

As shown in FIG. 2, when initially deployed the risers 28 of the parachute system (not shown), which may comprise one or more parachutes and generally referred to herein as the "parachute", are attached to the unrotated handle 22. The offset position of the attachment plate 26 with respect to a central axis 30 of the CM 10 results in the CM 10 being suspended from the risers 28 with a deck angle of nominally 37° between a horizontal reference 32 and a reference station plane 34 for the example embodiment shown. In this configuration the CM 10 may undergo a water landing or provide the desired deck angle for other operational considerations.

Figure 3:
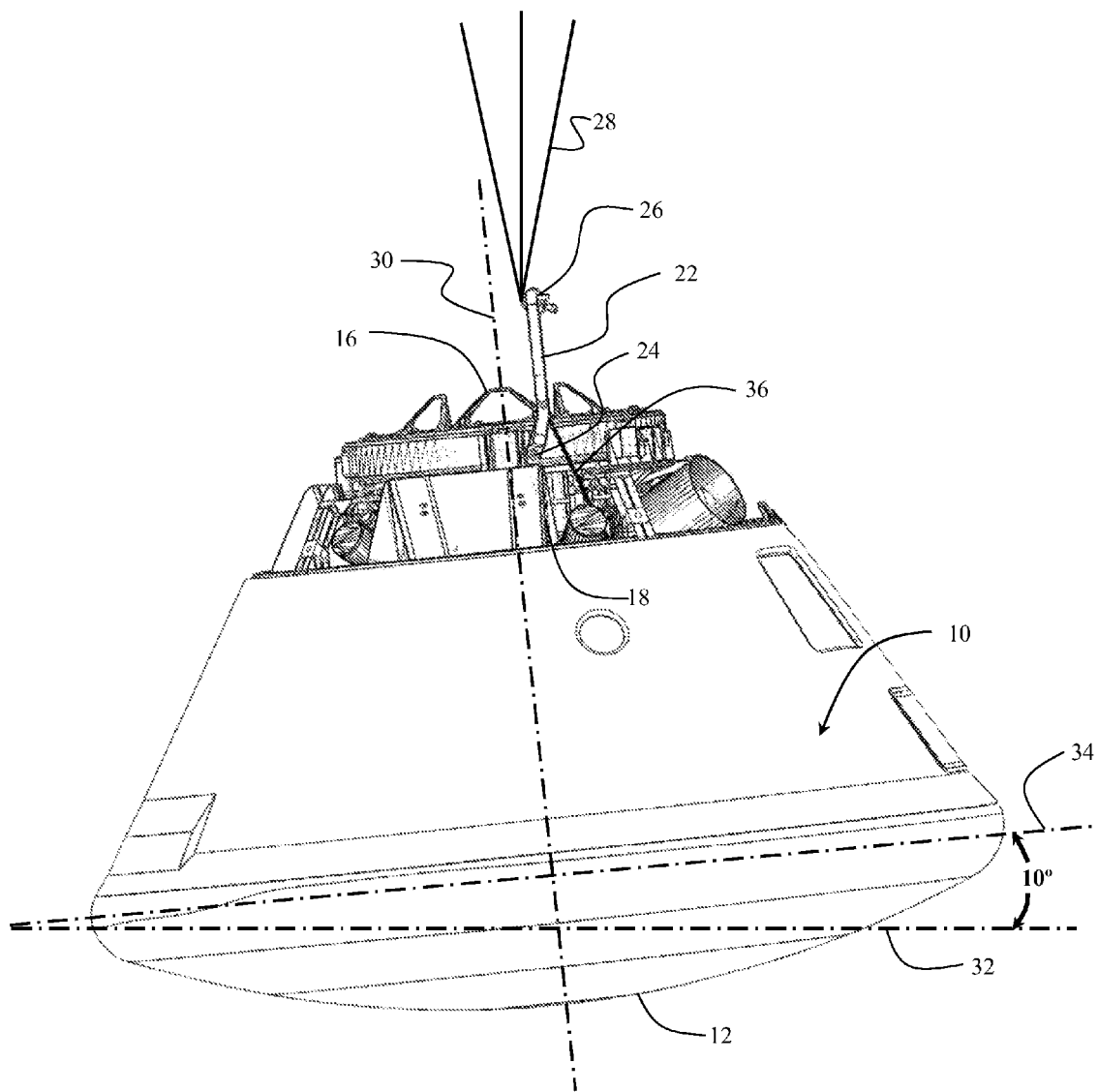
FIG. 3 is a side view of the spacecraft suspended from risers with the handle of FIG. 2 in the rotated position for reduced deck angle.

As shown in FIG. 3, if desired to accommodate a landing of the CM on land (hard surface) or for differing operational considerations a lower deck angle is desired, handle 22 may be released for rotation about hinges 24. In this regard, handle 22 is oriented substantially vertically or parallel to the CM central axis 30. Rotation of the handle 22 may be limited by dampers 36, to be described in greater detail subsequently. In the example embodiment shown in FIGS. 1-3, the hinges 24 are laterally displaced from the axis 30 on the support structure 18. In the unattached or deployed position, this nominal displacement induces a hang angle due to a center of gravity offset which in turn provides a suspended deck angle of approximately 10° between the horizontal baseline 32 and the reference station plane 34. For the embodiment shown, the offset of the handle 22 and support structure 18 precludes undesired impact on or interference with the docking mechanism 16. In alternative embodiments, a relatively more central or symmetrical configuration of the handle 22 and support structure 18 may be desired. Specific desired hang angles may also be obtained by limiting rotation of the handle 22 using a controlled release of the damper 36, and intermediate stops between the initial 37° deck angle and the ultimate 10° deck angle. Additionally, a center of gravity that is off-axis from the central axis 30 will result in an off-axis hang angle that may be sustained or altered by placement of the locations of the hinges 24 or rotation angle of the handle 22.

Figure 4A:
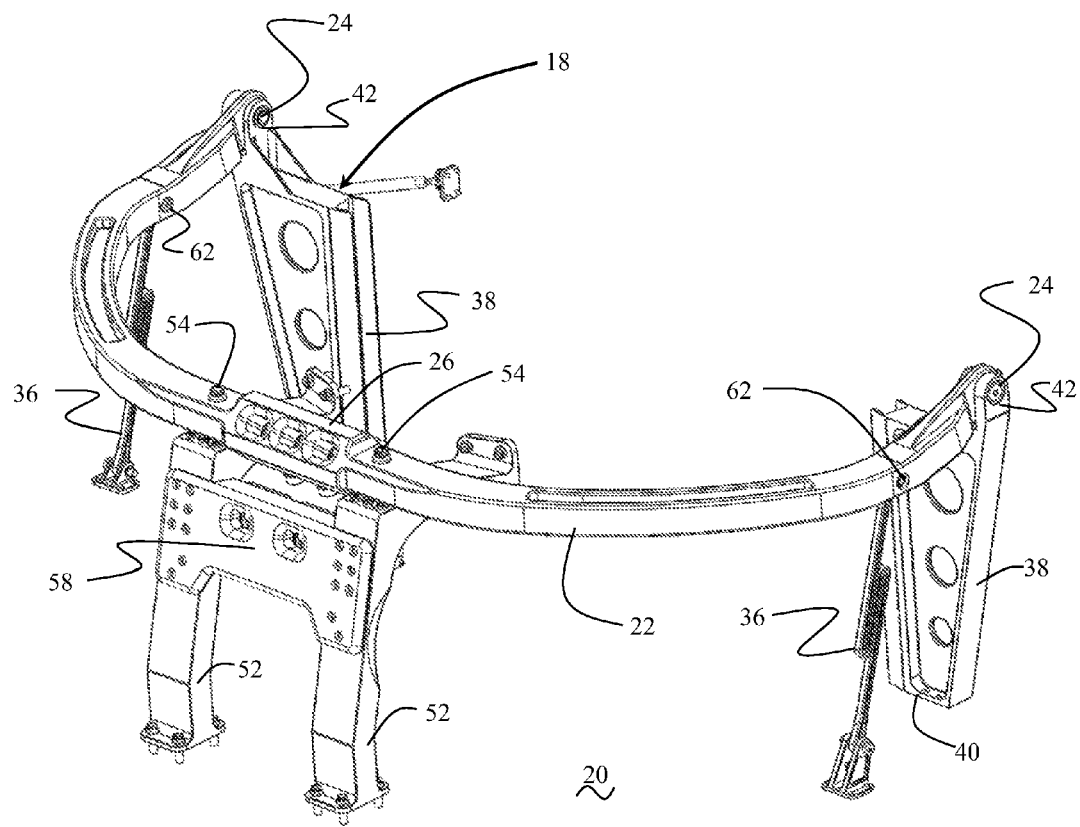
FIG. 4A is a detailed isometric view of a support structure and handle according to one embodiment.
Figure 4B:
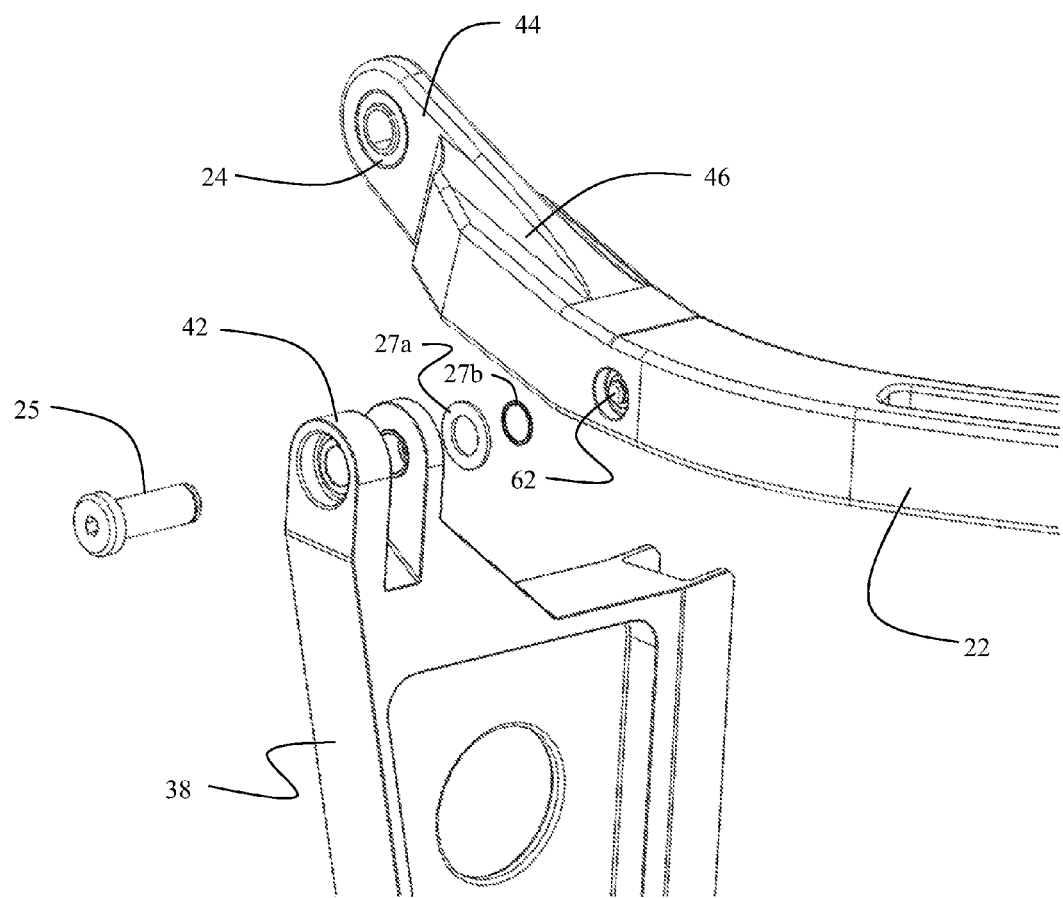
FIG. 4B is a detailed exploded partial isometric view of the elements of hinges according to one embodiment.
Figure 5A:
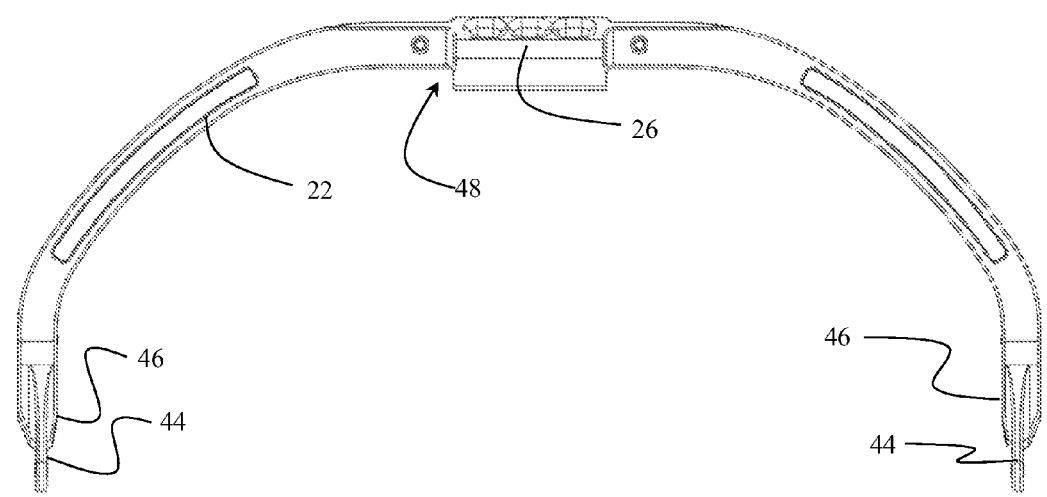
FIG. 5A is a front view of the handle.

Details of the support structure 18, the handle 22, and the hinges 24 are shown in FIG. 4A. Support structure 18 incorporates vertical hinge fittings 38 which are attached at a bottom flange 40 to the forward bulkhead 20. Hinges 24 are supported in clevises 42 extending from the hinge fittings 38 distal from the bottom flanges 40. Hinges 24 may be spherical bearings or similar rotational support elements engaged by pivot pins 25 inserted through the clevises and retained by washers 27a and clips 27b as shown in detail in FIG. 4B. Handle 22, which is also shown in additional detail in FIGS. 5A and 5B, may have an arcuate shape for the example embodiment but may be of alternative geometric shapes in other embodiments as may be required to accommodate structural loads or overall CM geometry such as a single hinged rod, a triangular handle, a rectangular or other multi-lateral handle. Tangs 44 extend from terminal ends 46 of the handle 22 to support the hinge elements and are received in the clevises 42. On or near a central portion 48 of the handle, an attachment plate 26 is provided for attachment of the risers 28.

In the unrotated or stored position as shown in FIG. 4A (and FIG. 3), the handle 22 is engaged at or near the central portion 48 by a support bracket 52 that extends from the forward bulkhead 20. For the example embodiment, the central portion 48 of the handle 22 is constrained to the support bracket 52 using separation assemblies such as pins or bolts 54 secured with handle release separation nuts. The separation assemblies may be mechanical or pyrotechnic and provide a controllable mechanism to release the handle 22 from the support bracket 52 for rotation to the extended position show in FIGS. 5A and 5B (and FIG. 2). In one example embodiment, two ¾ inch pyrotechnic separation bolts were employed to secure and release the handle 22. For the embodiment shown a drogue attach fitting 58 is also attached to the support bracket 52 providing an attach point for drogue shroud lines 57 (seen in FIG. 1) proximate the attachment plate 26. Canisters 59a and 59b (also shown in FIG. 1) for storage of the drogue chutes are provided in the nose of the CM in a manner comparable to the containers 29a-29c.

Figure 5B:
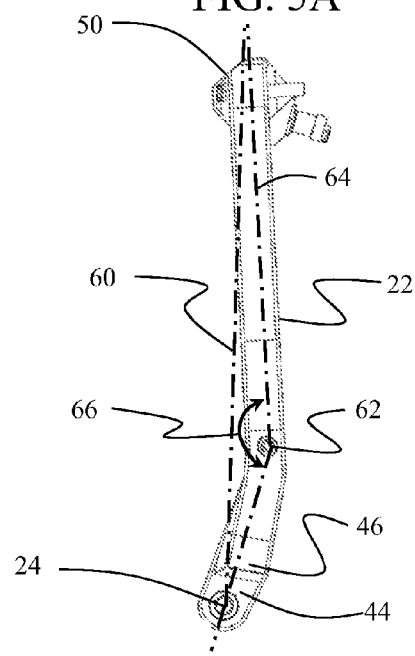
FIG. 5B is a side view of the handle.

For the example embodiment shown in FIG. 5B, the handle 22 incorporates a dog leg geometry allowing an offset from a neutral plane 60 extending through the hinges 24 and attachment plate 26 for attachment bosses 62 to connect dampers 36 (seen in FIG. 4A). The dog leg angle 66 allows alignment of an upper portion 64 of the handle 22 parallel to the central axis 30 in the deployed condition or for other adjustment of desired hang angle or requirements of deployment dynamics.

Figure 6:
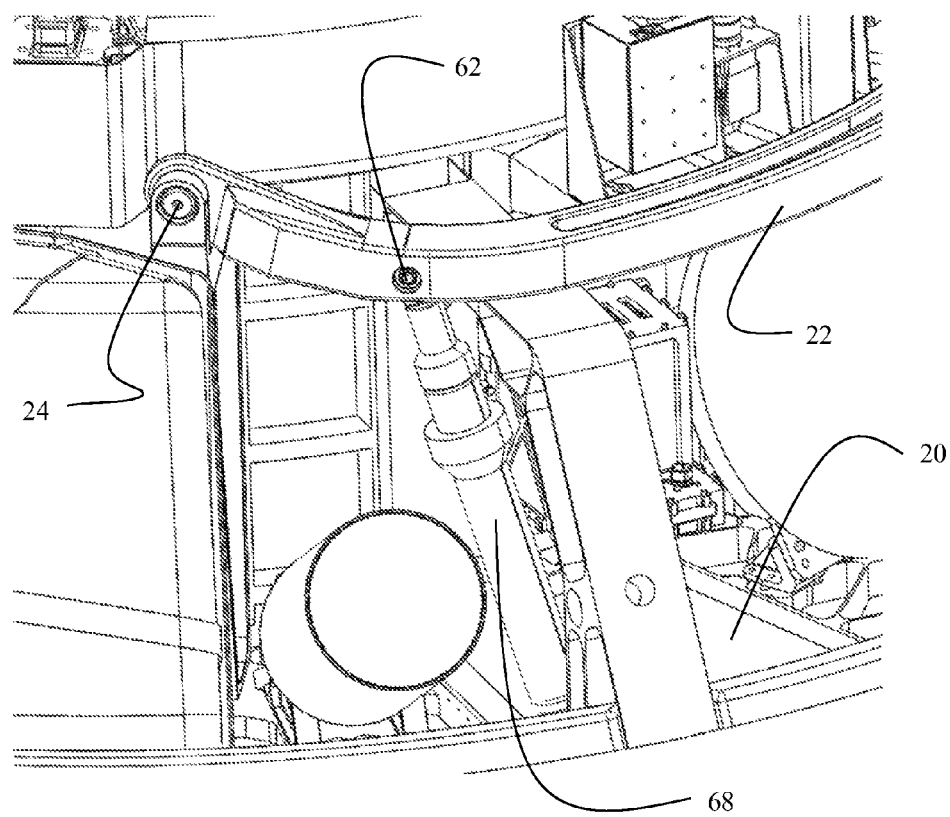
FIG. 6 is a pictorial view of a damper according to one embodiment.

The dampers 36 in certain embodiments may be mechanical, hydraulic or pneumatic shock absorbers 68 as shown in FIG. 6. The shock absorbers 68 extend from the forward bulkhead 20 for connection at the attachment bosses 62 on handle 22. The shock absorbers 68 may be adjustable or actively controllable for extension length to limit rotation of the handle 22 at desired angles for altering the hang angle of the CM 10 during descent and landing. In alternative embodiments, as for the primary example shown in the other drawings, dampers 36 may be an extendible strap 70 connected from the forward bulkhead 20 to the attachment bosses 62 as shown in FIG. 7A.

Figure 7A:
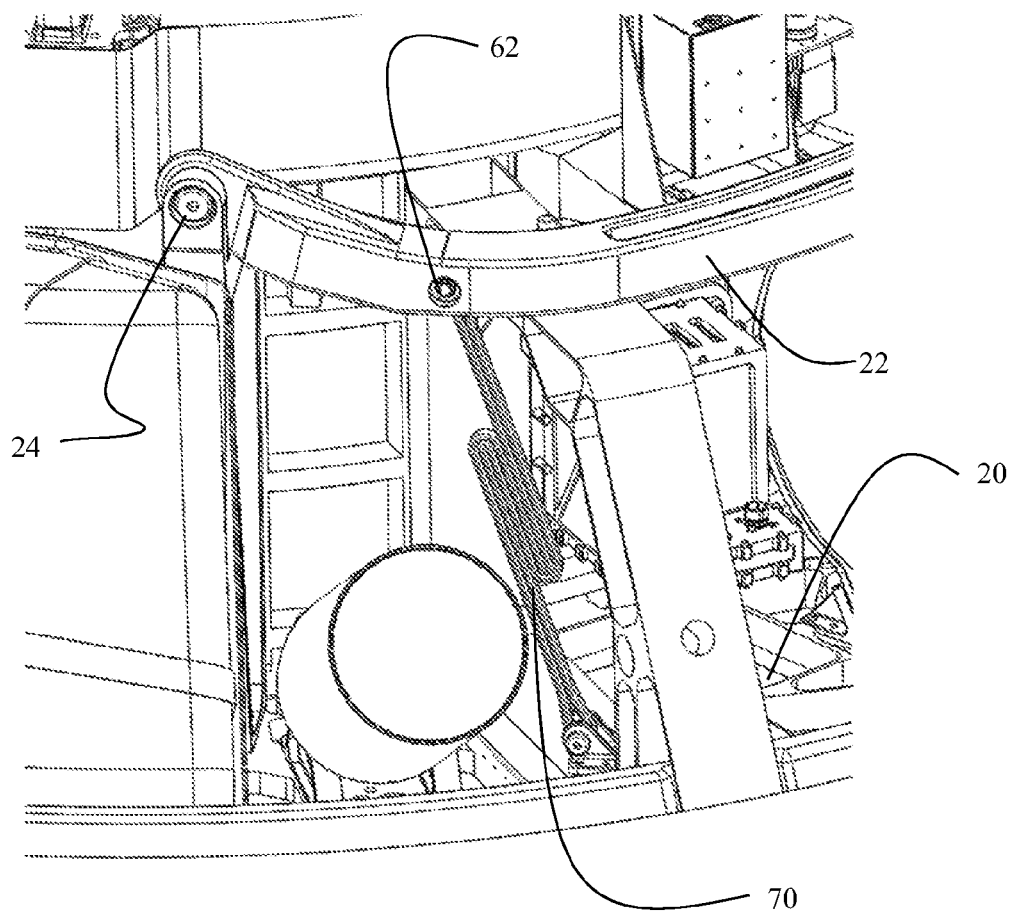
FIG. 7A is a pictorial view of a damper and handle in an unrotated configuration according to one embodiment.
Figure 7B:
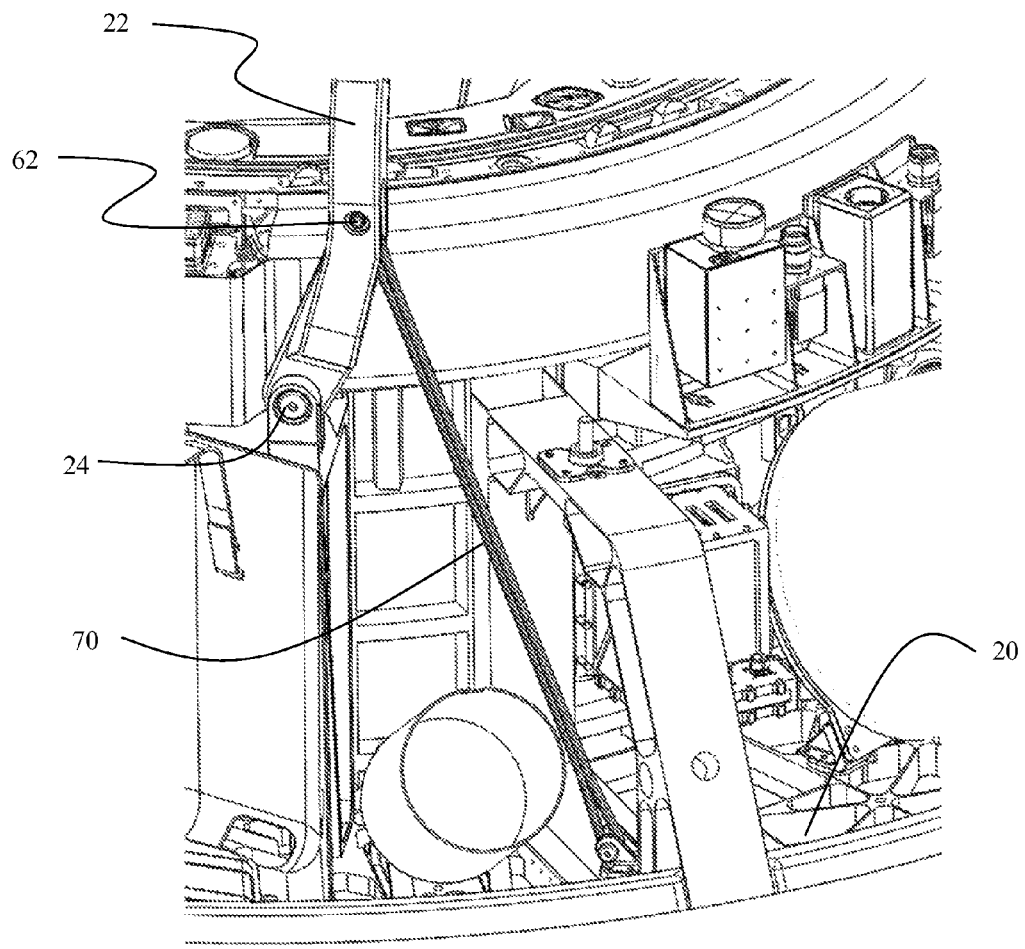
FIG. 7B is a pictorial view of the damper and handle of FIG. 7B in a rotated configuration; and, FIG. 8 is a flow chart showing a method for adjustment of hang angle of an airborne vehicle such as the example spacecraft.

For the embodiment of FIG. 7A, the straps 70 may be folded and secured with frangible bands or other means for compact storage with the handle 22 in the unrotated position. Upon release of the separation assemblies allowing the handle 22 to rotate about the hinges 24 to the extended position, the straps 70 extend and limit (dampen) rotation of the handle as shown in FIG. 7B. In one embodiment, the straps 70 may be of a textile material fabricated from aramid fiber materials such as Kevlar®, liquid crystal polymer fiber materials such as Vectran®, Nylon or comparable materials.

Figure 8:
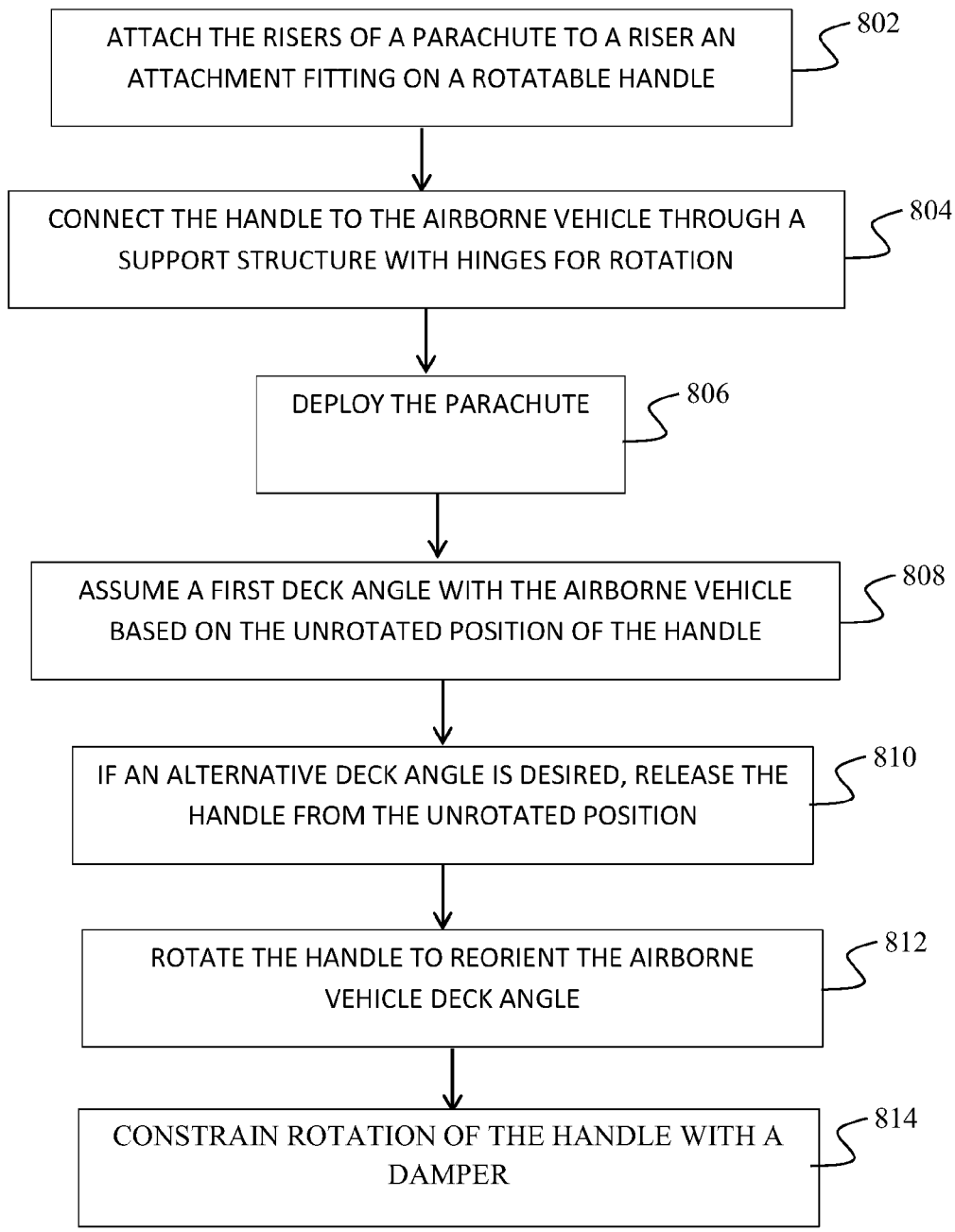

The embodiments described provide a method for altering a hang angle of an airborne vehicle such as a CM 10 suspended by risers for a parachute descent and landing as shown in FIG. 8. The risers 28 of a parachute are attached to an attachment plate 26 disposed on a handle 22, step 802. The handle 22 is connected to the airborne vehicle through a support structure 18 with hinges 24 for rotation of the handle 24, step 804. Upon deploying the parachute, step 806, the airborne vehicle assumes a first deck angle based on the unrotated position of the handle 22, step 808. If an alternative deck angle is desired, release assemblies such as pyrotechnically actuated bolts 54 are employed to release the handle 22 from the unrotated position, step 810. The handle 22 then rotates to reorient the airborne vehicle deck angle, step 812. Rotation of the handle 22 may be constrained with a damper 36, step 814.

Having now described various embodiments of the disclosure in detail as required by the patent statutes, those skilled in the art will recognize modifications and substitutions to the specific embodiments disclosed herein. Such modifications are within the scope and intent of the present disclosure as defined in the following claims.

What is claimed is:

1. An apparatus for reorientation of an airborne vehicle during descent comprising:
   a handle having a first end and second end, the handle being rotatably attached to an airborne vehicle and connected to a parachute,
   a first hinge on the first end of the handle, and
   a second hinge on the second end of the handle,
   said first and second hinge rotatably attaching the handle to the airborne vehicle for rotation of the handle from an unrotated position to the rotated position,
   wherein the apparatus has a first configuration where the parachute is deployed and the handle is in the unrotated position, and a second configuration where the parachute is deployed and the handle is in the rotated position,
   wherein rotation of the handle to the rotated position reorients a deck angle of the airborne vehicle.

2. The apparatus of claim 1 further comprising an attachment fitting on the handle for attachment of risers to the parachute.

3. The apparatus of claim 1 further comprising at least one damper connected between the handle and the airborne vehicle to limit rotation of the handle.

4. A parachute attachment system comprising:
a handle having a first end and second end, the handle being rotatably attached to an airborne vehicle and having an unrotated position and a rotated position;
a first hinge on the first end of the handle;
a second hinge on the second end of the handle;
said first and second hinge rotatably attaching the handle to the airborne vehicle;
a riser attachment fitting on the handle for attachment of parachute risers; and,
at least one release assembly operable to release the handle from the unrotated position to the rotated position,
wherein the attachment system has a first configuration where a parachute attached to the parachute risers is deployed and the handle is in the unrotated position, and a second configuration where the parachute is deployed and the handle is in the rotated position, and
wherein a suspended deck angle of the airborne vehicle is altered upon rotation of the handle between the unrotated and rotated position.

5. The parachute attachment system of claim 4 further comprising:
a support structure attached to the airborne vehicle;
wherein said first and second hinge interconnect the handle to the support structure for rotation of the handle from the unrotated position to the rotated position.

6. The parachute attachment system of claim 5 further comprising:
at least one damper connected between the handle and the air vehicle to limit rotation of the handle.

7. The parachute attachment system of claim 6 wherein the damper is a mechanical, pneumatic or hydraulic shock absorber.

8. The parachute attachment system of claim 6 wherein the damper is a textile strap.

9. The parachute attachment system of claim 8 wherein the textile strap is folded and constrained with frangible bands with the handle in the unrotated position.

10. The parachute attachment system of claim 6 wherein the handle is a dog leg configuration having an attachment boss for the damper.

11. The parachute attachment system of claim 6 wherein an angle of the dog leg aligns an upper portion of the handle parallel to a central axis of the airborne vehicle.

12. The parachute attachment system of claim 4 wherein the handle is arcuate.

13. The parachute attachment system of claim 4 wherein the unrotated position of the handle provides a first deck angle for water landing and the rotated position of the handle provide a second deck angle for surface landing.

14. A method of reorientation of an airborne vehicle during parachute descent comprising:
attaching a parachute to a rotatable handle, the rotatable handle connecting to an airborne vehicle having a first deck angle;
attaching the rotatable handle to the airborne vehicle with a first hinge at a first end of the handle and attaching the rotatable handle to the airborne vehicle with a second hinge at a second end of the handle;
deploying the parachute; and
rotating the handle from an unrotated position to a rotated position to reorient the airborne vehicle to a second deck angle.

15. The method of claim 14 further comprising attaching the rotatable handle to the airborne vehicle with said first and second hinges in a support assembly mounted to the airborne vehicle.

16. The method of claim 14 further comprising constraining the rotation of the handle with a damper.

17. The method of claim 14 wherein the step of rotating the handle includes selectively releasing the handle from said unrotated position using release assemblies to alter the deck angle of the airborne vehicle.

* * * * *